United States Patent
Kernilis et al.

(10) Patent No.: US 9,528,470 B2
(45) Date of Patent: Dec. 27, 2016

(54) FEED SYSTEM AND A METHOD OF SUPPRESSING THE POGO EFFECT

(75) Inventors: Alain Kernilis, Freneuse (FR); Nicolas Lemoine, Vernon (FR); Ludivine Boulet, Aix-en-Provence (FR); Serge Le Gonidec, Vernon (FR)

(73) Assignees: SNECMA, Paris (FR); CENTRE NATIONAL D'ETUDES SPATIALES CNES, Paris (FR)

( * ) Notice: Subject to any disclaimer, the term of this patent is extended or adjusted under 35 U.S.C. 154(b) by 397 days.

(21) Appl. No.: 14/118,369

(22) PCT Filed: May 7, 2012

(86) PCT No.: PCT/FR2012/051005
§ 371 (c)(1),
(2), (4) Date: Jan. 13, 2014

(87) PCT Pub. No.: WO2012/156615
PCT Pub. Date: Nov. 22, 2012

(65) Prior Publication Data
US 2014/0174054 A1    Jun. 26, 2014

(30) Foreign Application Priority Data

May 17, 2011   (FR) ...................................... 11 54298

(51) Int. Cl.
*F02K 9/50*   (2006.01)
*F02K 9/60*   (2006.01)
*F02K 9/56*   (2006.01)

(52) U.S. Cl.
CPC . *F02K 9/50* (2013.01); *F02K 9/56* (2013.01); *F02K 9/566* (2013.01); *F02K 9/60* (2013.01); *F05D 2270/44* (2013.01)

(58) Field of Classification Search
CPC .. F02C 7/24; F05D 2260/96; F05D 2260/962; F05D 2260/963; F02K 9/566; F02K 9/50; F02K 9/605; F02K 9/72; F02K 9/60; B64G 1/401; B64G 1/402
See application file for complete search history.

(56) References Cited

U.S. PATENT DOCUMENTS

| | | | |
|---|---|---|---|
| 3,286,882 A | 11/1966 | Tripp | |
| 3,427,808 A | 2/1969 | Butcher | |
| 4,039,000 A * | 8/1977 | Fletcher | F02K 9/46 137/207 |

(Continued)

FOREIGN PATENT DOCUMENTS

| | | |
|---|---|---|
| FR | 2.161.794 | 7/1973 |
| FR | 2 499 641 | 8/1982 |

(Continued)

OTHER PUBLICATIONS

International Search Report issued Jan. 28, 2013, in International Application No. PCT/FR2012/051005.

*Primary Examiner* — Andrew Nguyen
(74) *Attorney, Agent, or Firm* — Oblon, McClelland, Maier & Neustadt, L.L.P.

(57) ABSTRACT

A rocket engine feed system, includes a feed circuit including a device for varying a gas volume in the feed circuit to suppress the POGO effect. A method of suppressing the POGO effect varies at least one hydraulic resonant frequency by varying a rate at which gas is injected into the feed circuit.

13 Claims, 6 Drawing Sheets

(56) References Cited

U.S. PATENT DOCUMENTS

| | | | | |
|---|---|---|---|---|
| 5,365,787 A | * | 11/1994 | Hernandez | G01H 1/003 324/207.25 |
| 5,636,513 A | * | 6/1997 | Pahl | F02K 9/50 60/204 |
| 5,918,460 A | | 7/1999 | Connell et al. | |
| 2004/0011020 A1 | * | 1/2004 | Nomura | F01D 17/162 60/39.281 |
| 2005/0271499 A1 | * | 12/2005 | Loy | F01D 11/025 415/1 |
| 2008/0197575 A1 | * | 8/2008 | El-Aini | F01D 11/02 277/303 |
| 2011/0048021 A1 | * | 3/2011 | Slobodyanskiy | F01D 9/023 60/725 |

FOREIGN PATENT DOCUMENTS

| | | |
|---|---|---|
| GB | 2 264 684 A | 9/1993 |
| JP | 3-287498 | 12/1991 |

\* cited by examiner

FEED SYSTEM AND A METHOD OF SUPPRESSING THE POGO EFFECT

BACKGROUND OF THE INVENTION

The present invention relates to a feed system for feeding a rocket engine with at least one liquid propellant, the system including at least one feed circuit.

In the field of liquid propellant rockets, the term "POGO effect" is used to designate the liquid propellant in the feed circuit of the rocket engine entering into resonance with mechanical oscillations of the rocket. Since the thrust of a rocket engine varies with the rate at which propellant is delivered by the feed circuit, such an entry in resonance can give rise to rapidly diverging oscillations and can thus give rise to difficulties in guidance, and even to damage that may go as far as total loss of the payload or even of the vehicle. The term "POGO effect" does not come from an acronym, but rather from pogo stick toys comprising a rod with a spring that bounces in a manner that reminded technicians of the violent longitudinal oscillations of rockets, as caused by this effect. From the beginning of the development of liquid propellant rockets, it has therefore been very important to take measures to suppress this POGO effect. In the context of the present description, the term "suppress" is used to cover both total elimination and partial reduction.

Two main types of POGO effect corrector systems are known to the person skilled in the art: passive systems and active systems. With passive systems, the hydraulic resonant frequencies are changed so that they cannot coincide with the mechanical resonant frequencies of the rocket. They can also be damped. This is done, for example, by installing hydraulic accumulators in the propellant feed circuit. Such a hydraulic accumulator is normally formed by a pressurized volume containing both gas and liquid, which volume is in communication with the feed circuit. The hydraulic accumulator operates as a mass-spring-damper system in which the mass is the mass of liquid in the accumulator, the spring is formed by the gas, and the damping comes from the viscosity of the liquid entering and leaving the accumulator via a narrow duct. French patent application FR 2 499 641 discloses one example of such a hydraulic accumulator that is adjustable in order to enable it to be adapted to different rocket engines. Nevertheless, variation in the compressibility and damping parameters of that accumulator cannot be carried out while the rocket engine is in operation. Another "passive" method of correcting the POGO effect consists in changing the hydraulic resonant frequency of the feed circuit by injecting a fixed flow rate of gas into the circuit so as to change the speed of sound in the circuit. In contrast, with active systems, an opposing oscillation of pressure and flow rate is established in the feed circuit to counter the oscillations that are measured in the circuit.

Nevertheless, both passive systems and active systems present drawbacks. Passive systems are not appropriate for rockets that present great variability in their mechanical frequencies while they are in operation, since they do not damp modes outside a narrow band around the frequencies for which they are designed. In the event of there being a difference between the predicted dynamic behavior and the real dynamic behavior of the flight of the rocket, they are not in a position to correct their action. Active systems are liable to have positive effects only locally and they can also generate effects that are negative, whether local or global.

In Japanese patent application JP 03-287498 A, there is proposed a POGO effect corrector system with an adaptive hydraulic accumulator. In that adaptive hydraulic accumulator, the compressibility can be varied by varying the pressure of the gas, and above all the damping can be varied by varying a flow-restriction device. Nevertheless, that presents several drawbacks. Firstly, varying pressure serves to vary compressibility in the hydraulic accumulator in only a very restricted manner. In addition, although it is possible to control greater variation in damping, the variable restriction device has moving parts in the flow of propellant, and that can lead to problems of reliability, particularly if the propellant is cryogenic.

OBJECT AND SUMMARY OF THE INVENTION

The present invention seeks to remedy those drawbacks.

This object is achieved by the fact that the feed system of the present invention comprises at least one device for varying a volume of gas in the feed circuit, which device is suitable for causing the volume of gas in the circuit to vary while said rocket engine is in operation.

In the context of the present disclosure, the term "varying" is used to mean causing a magnitude to change successively through a plurality of different values, whether gradually or stepwise. Thus, said device for varying gas volume makes it possible to obtain a plurality of different volumes of gas in the circuit in succession.

By means of these provisions, it is thus possible to vary at least one hydraulic resonant frequency of the circuit over a wide range of frequencies while the rocket engine is in operation, thereby avoiding the mechanical resonant frequencies of a support structure even when they also vary while the rocket engine is in operation. It is also easy to adapt a given hydraulic circuit to a plurality of different structures having different mechanical resonant frequencies.

In at least one embodiment of the invention, said device for varying the volume of gas may comprise at least one hydraulic accumulator with a variable liquid level. Amongst other things, this presents the advantage of providing comparatively simple means for varying the volume of gas, and thus for varying the compressibility and the hydraulic resonant frequency in the circuit. In particular, said hydraulic accumulator may have a gas feed point, a connection to a duct of said propellant feed circuit, and between said gas feed point and said connection, at least one dip tube connecting said duct to said variable liquid level of the hydraulic accumulator.

In a first variant, the hydraulic accumulator has a plurality of dip tubes, each including a respective valve and connecting said duct to a respective distinct liquid level. By opening and closing the valves, it is possible to equalize the pressure at the free surface of the liquid with the pressure of the duct at various levels.

It is thus possible to vary very substantially the volume of gas in the hydraulic accumulator, and thus to vary the compressibility of the hydraulic accumulator and at least one hydraulic resonant frequency of the circuit.

In a second variant, the at least one dip tube is movable in order to vary the liquid level that it connects to the duct. It is thus possible to obtain continuous variation of at least one hydraulic resonant frequency.

In at least one other embodiment, said device for varying gas volume may advantageously comprise at least one variable-flowrate gas injector. This also presents the advantage of providing means for varying at least one hydraulic frequency, which means are of complexity that is not significantly greater than the complexity of prior art passive systems.

Advantageously, the feed system further comprises a control unit for controlling said device for varying gas volume. This control unit makes it possible to associate a command for varying the gas volume with parameters such as an estimated mechanical resonant frequency, time since starting the rocket engine, etc.

Still more advantageously, the feed system further comprises at least one sensor connected to said control unit, said control unit is configured to control variation in the gas volume as a function of signals sensed by said sensor. In particular, said at least one sensor may comprise an accelerometer, thus enabling mechanical oscillations to be detected and/or enabling at least one mechanical resonant frequency to be estimated and/or enabling its variation to be estimated. Said at least one sensor may also comprise a pressure sensor for sensing the pressure of said propellant, which may make it possible to estimate at least one hydraulic resonant frequency of said feed circuit, and/or to estimate how it will vary. By means of this provision, it is possible to detect when at least one mechanical resonant frequency comes close to at least one hydraulic resonant frequency, and to vary the hydraulic resonant frequency so as to avoid the POGO effect.

In at least one other embodiment, said control unit is configured to control variation of the gas volume as a function of time. Thus, if it is known in advance how the behavior of at least one mechanical resonant frequency of the structure coupled to the feed circuit is going to vary over time, e.g. as a result of prior testing and/or simulations or calculations, it is possible to program the variation of at least one hydraulic resonant frequency as a function of time so as to avoid coincidence between resonant frequencies, and thus avoid the POGO effect, while the rocket engine is in operation.

Although those two options may be considered as alternatives, it is also possible to combine them, e.g. using a base setpoint that is a function of time and a correction factor that is a function of signals picked up by a sensor.

The present invention also provides a vehicle including at least one rocket engine using at least one liquid propellant with a feed system of the invention. In the context of the present disclosure, the term "vehicle" should be understood broadly. Thus, the invention may be applied to single- or multi-stage space launchers, to individual stages of such space launchers, or to space vehicles such as satellites, probes, capsules, or shuttles, and also to single- or multi-stage guided or non-guided projectiles, or to individual stages of such projectiles. In any event, the invention presents the advantage of making the vehicle more reliable so as to conserve its payload all the way to its destination.

The present invention also provides a method of suppressing the POGO effect, wherein a volume of gas in a feed circuit of a system for feeding a rocket engine with at least one liquid propellant is caused to vary while said rocket engine is in operation so as to control a difference between at least one hydraulic resonant frequency of the feed circuit and at least one mechanical resonant frequency of a structure coupled to said feed circuit.

The variation in the compressibility of the gas-and-liquid fluid contained in the feed circuit thus enables at least one hydraulic resonant frequency to be varied over a wide range. It is thus possible to avoid the hydraulic and mechanical systems entering into resonance, thereby leading to the POGO effect.

In at least one implementation, said gas volume varies so as to keep said difference above a predetermined threshold. This obtains a safety margin corresponding to the threshold.

Nevertheless, in particular when there are a plurality of hydraulic resonant frequencies and/or a plurality of mechanical resonant frequencies, it may be advantageous to cause at least one hydraulic resonant frequency to vary in such a manner as to maximize a function of at least one difference between a hydraulic resonant frequency of the feed circuit and a mechanical resonant frequency of the structure. In particular, if this function is a function of a plurality of differences, each corresponding to a different pair of respective hydraulic and mechanical resonant frequencies, this function may be a weighted function, with an individual coefficient for each pair.

The variable gas volume may be located at least in part in a hydraulic accumulator connected to a duct of said feed circuit, so as to cause it to vary by varying the volume of gas in the accumulator. It may also be caused to vary by varying the rate at which gas is injected into at least one propellant in said feed circuit. Bubbles of gas in suspension in the propellant thus provide a variable degree of compressibility to the gas-and-liquid fluid contained in the feed circuit, with this being expressed in particular by variations in the speed of sound in the circuit, and in said hydraulic resonant frequency.

Advantageously, the gas volume may be caused to vary as a function of time and/or of at least one mechanical oscillation value sensed on said structure, in particular a mechanical oscillation on which spectral analysis is performed in order to determine at least one mechanical resonant frequency of said structure. Still more advantageously, a filter algorithm, e.g. such as an "unscented" Kalman filter (UKF), is applied to at least one sensed mechanical oscillation in order to determine at least one mechanical resonant frequency and/or to predict its future variation, thus making it easier to avoid coincidence between the at least one mechanical resonant frequency and the at least one hydraulic resonant frequency.

The present invention also provides a computer data support including instructions executable by a computer in order to perform a method of the invention for suppressing the POGO effect. The term "computer data support" is used to mean any support suitable for storing data in durable and/or transient manner, and for allowing the data subsequently to be read by a computer system. Thus, the term "computer data support" covers, amongst other things: magnetic tapes, magnetic and/or optical disks, and solid state electronic memories which may be volatile or non-volatile.

The present invention may thus also be expressed in the form of a computer programmed to perform the method of the invention for suppressing the POGO effect, or even by software for use with a computer to perform the method of the invention for suppressing the POGO effect.

BRIEF DESCRIPTION OF THE DRAWINGS

The invention can be well understood and its advantages appear better on reading the following detailed description of embodiments given as non-limiting examples. The description refers to the accompanying drawings, in which.

DETAILED DESCRIPTION OF THE INVENTION

Figure 1:
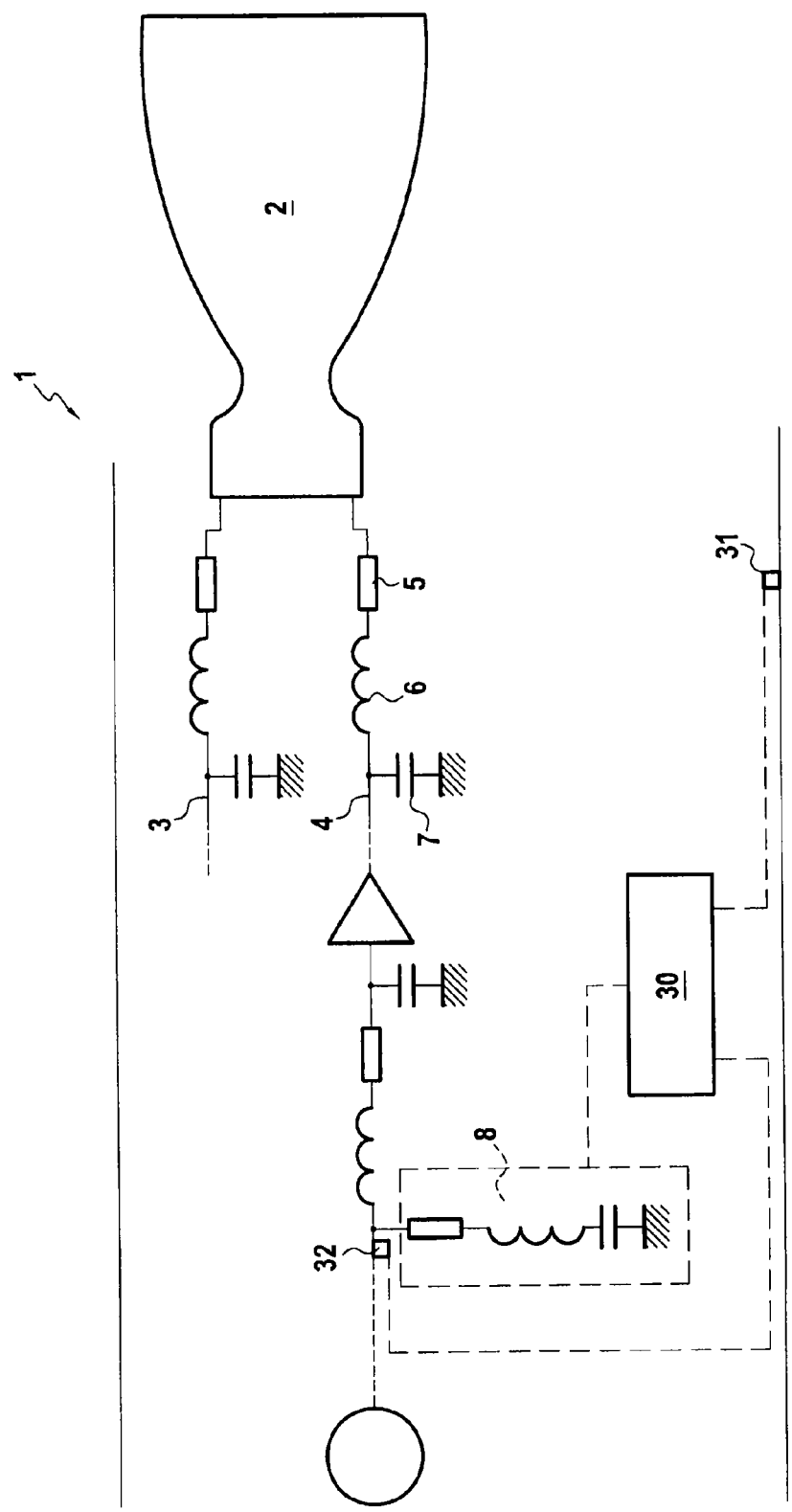
FIG. 1 is a diagram based on an analogy between hydraulic circuits and electrical circuits, showing a rocket engine vehicle with a liquid propellant feed system in an embodiment of the invention.

The vehicle 1 shown in FIG. 1 has a propulsion chamber 2 incorporating a combustion chamber and a convergent-divergent nozzle. The vehicle 1 also has a feed circuit 3, 4 for each of two liquid propellants that react chemically with each other and that are fed to the propulsion chamber 2. The first feed circuit 3 is shown in part only. Each feed circuit 3, 4 filled with fluid represents a dynamic system that can be modelled like an electrical circuit having resistors 5, inductors 6, and capacitors 7, and that presents at least one resonant frequency.

Figure 2A:
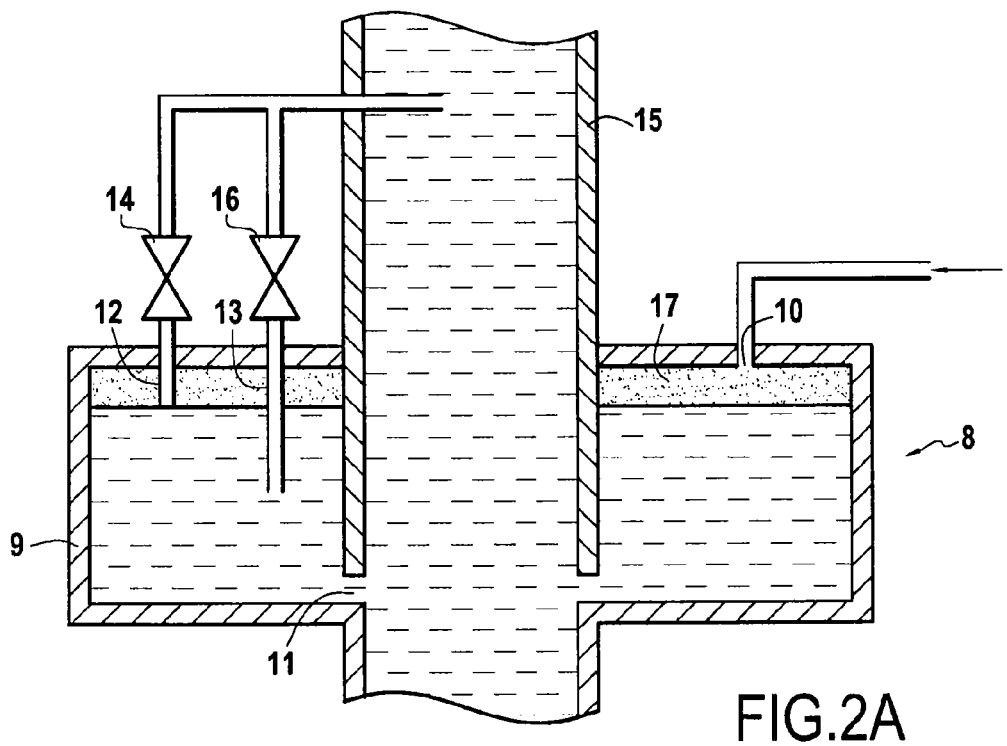
FIGS. 2A and 2B are cross-sections through a variable-volume accumulator installed in parallel with a feed circuit of the FIG. 1 system.
Figure 2B:
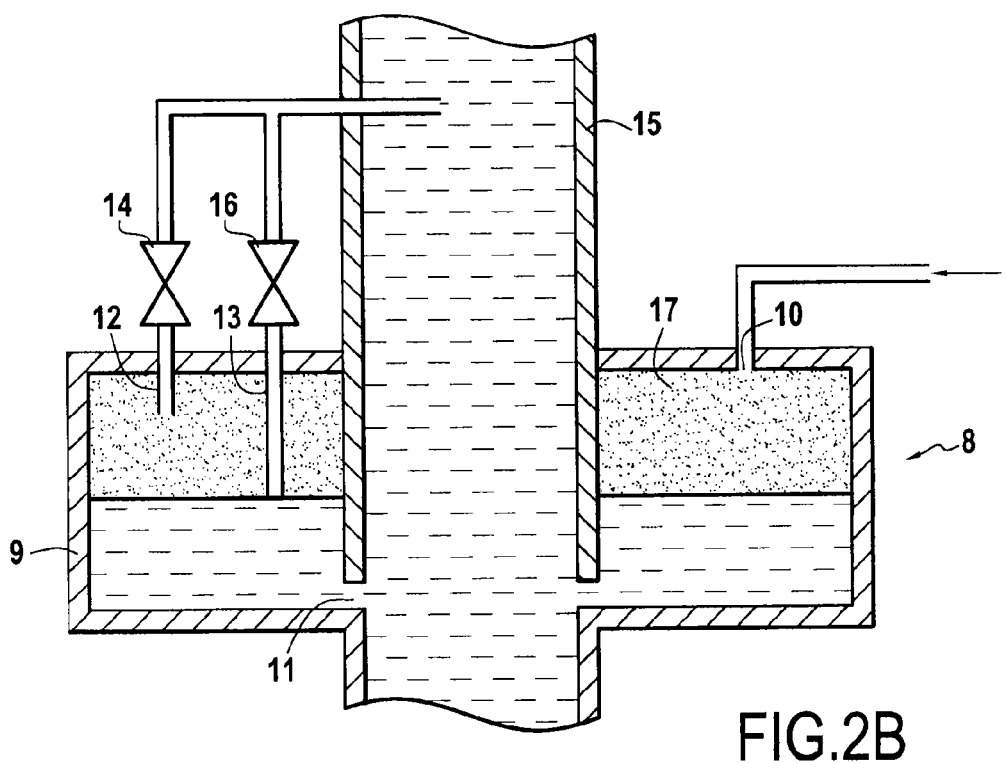

In order to cause at least one resonant frequency of the second feed circuit 4 to vary, the circuit includes in parallel therewith a hydraulic accumulator 8 having a volume of gas that is variable and thus presenting compressibility that is also variable. This accumulator 8, shown in FIGS. 2A and 2B, comprises a tank 9 with a pressurized gas feed point 10 on one side and a connection 11 to a duct 15 of the second feed circuit 4 on an opposite side. At various levels between the point 10 and the connection 11, dip tubes 12, 13 connect the tank 9 with the duct 15. Each dip tube 12, 13 includes a respective valve 14, 16 that is interposed between the tank 9 and the duct 15. Opening and closing the valves 14 and 16 thus makes it possible to vary the liquid level, and thus the volume of gas 17, inside the tank 9, as shown in FIGS. 2A and 2B. In FIG. 2A, the valve 14 of the shorter dip tube 12 is open, while the valve 16 of the dip tube 13 is closed. The free surface of the liquid is thus stabilized at the level of the inlet to the dip tube 12, and the volume of gas 17 together with its compressibility thus remains comparatively limited. In contrast, in FIG. 2B, the valve 14 of the dip tube 12 is closed, and the valve 16 of the dip tube 13 is open. The free surface of the liquid is thus stabilized at the lower level of the inlet to the dip tube 13, and the volume of gas 17 and its compressibility is increased accordingly.

By varying the effective compressibility of the accumulator 8, it thus becomes possible, even while the rocket engine of the vehicle 1 is in operation, to adapt the hydraulic resonant frequency of the second feed circuit 4 so as to prevent it from coinciding with a variable mechanical resonant frequency of a support structure of the rocket engine. Naturally, in order to achieve this result, it is necessary to have perceptible acceleration in order to separate the heavier liquid from the lighter gas. This hydraulic accumulator 8 of variable gas volume therefore does not operate in the same manner under conditions of microgravity.

Figure 3:
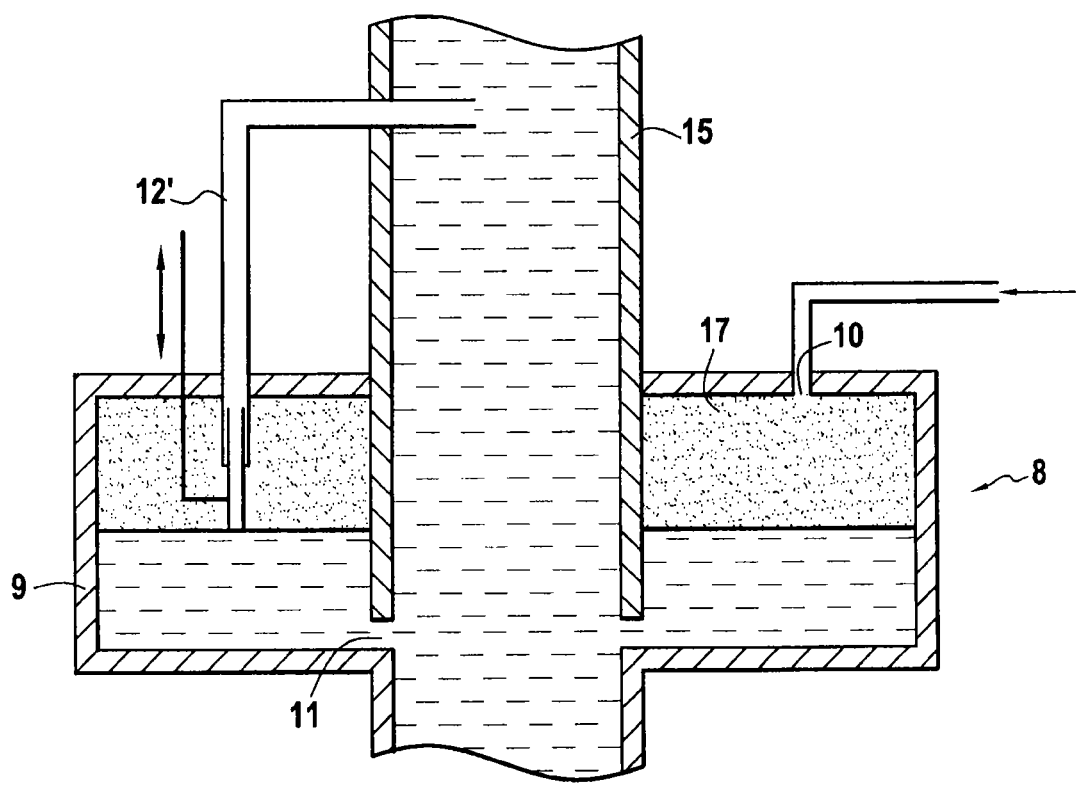
FIG. 3 is a cross-section of a variable-volume accumulator in a second embodiment of the invention.

In a second embodiment as shown in FIG. 3, the accumulator 8 likewise has a tank 9 with a pressurized gas feed point 10 on one side and a connection 11 to a duct 15 of the second feed circuit 4 on an opposite side, but it has only one dip tube 12', which tube is however movable in the depth direction of the tank 9 in order to vary the level of the liquid, and thus the gas volume 17 inside the tank 9. This embodiment makes it possible to vary the liquid level continuously and thus to vary the gas volume continuously, and hence varies the compressibility in the accumulator 8 and the hydraulic resonant frequency of the second feed circuit 4.

Figure 4:
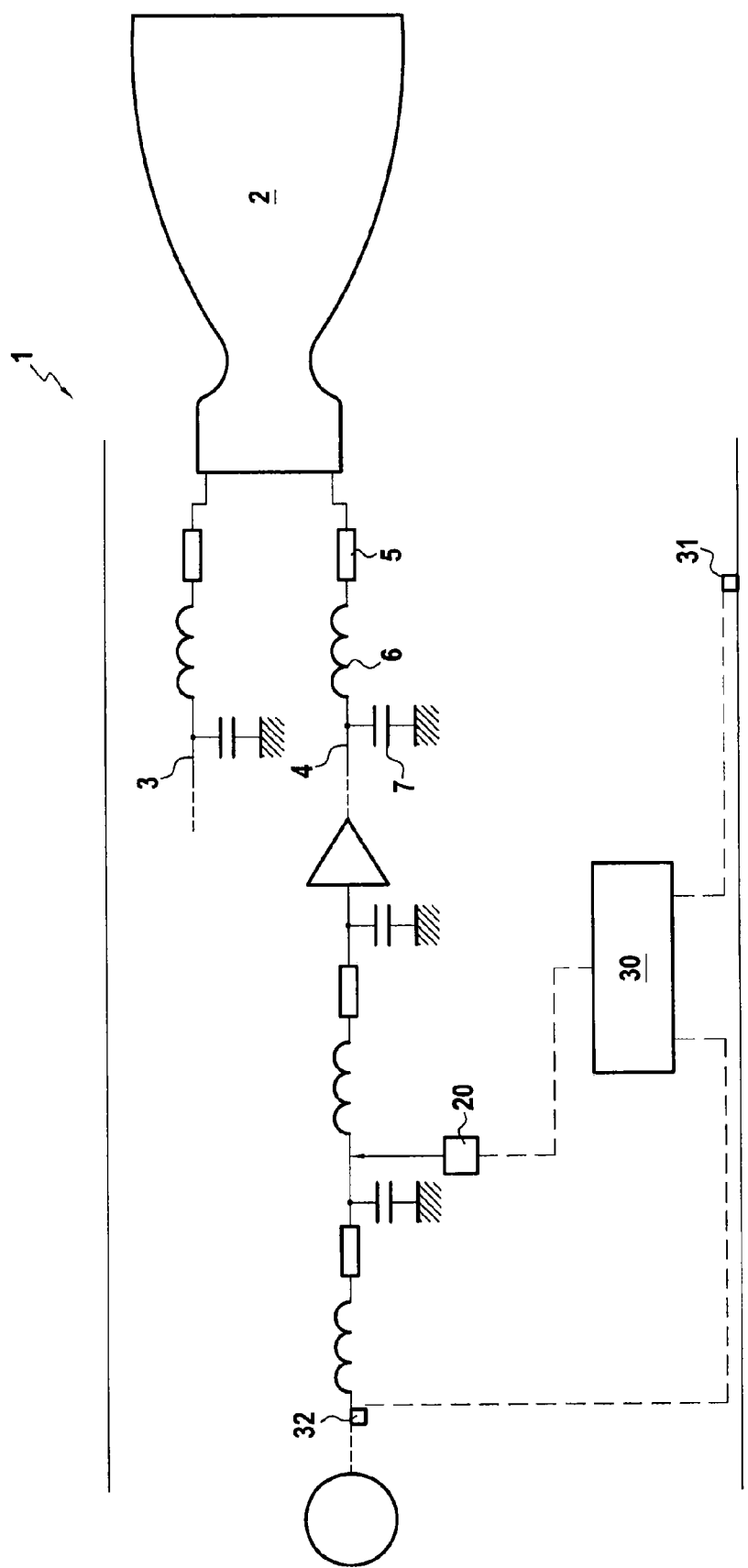
FIG. 4 is a diagram based on an analogy between hydraulic circuits and electrical circuits, showing a rocket engine with a liquid propellant feed circuit in a third embodiment of the invention.

A third embodiment is shown in FIG. 4. As in the embodiment of FIG. 1, in this other embodiment, the vehicle 1 likewise has a feed system with a feed circuit 3, 4 for feeding each of two liquid propellants that react chemically with each other and that are fed to a propulsion chamber 2.

Nevertheless, in this third embodiment, the at least one hydraulic resonant frequency of the second feed circuit 4 is caused to vary by injecting gas at a variable rate into the fluid of the feed circuit 4 by means of a gas injection device 20 connected to the second feed circuit 4. Downstream from this injection point 20, the compressibility of the liquid/gas fluid in the circuit is modified by the compressibility of the injected volume of gas. Consequently, the at least one hydraulic resonant frequency of the feed circuit 4 and also the speed of sound in the circuit 4 are also varied.

Figure 5:
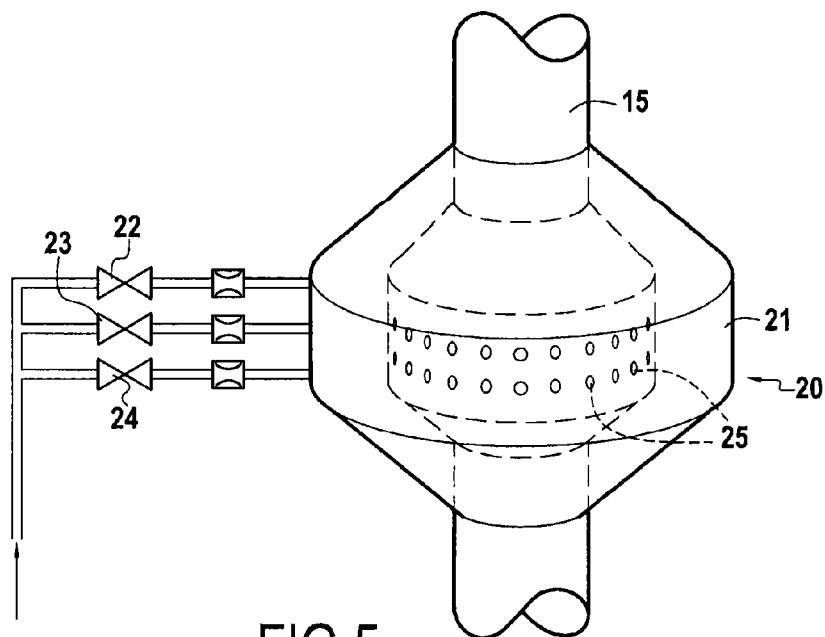
FIG. 5 is a diagram of a gas injection point connected to the FIG. 4 circuit.

The gas injection device 20 is shown in FIG. 5. It is installed on a duct 15 of the second feed circuit 4 and it comprises an annular chamber 21 around the duct 15, which chamber is connected to a source of pressurized gas (not shown) via three valves 22, 23, and 24, and communicates with the duct 15 via injection orifices 25. The rate at which gas is injected into the duct 15, and thus into the second feed circuit, can thus be varied by opening and closing the valves 22, 23, and 24. Alternatively, or in combination with the above arrangement, such a gas injection device could include a variable-opening valve or a flow rate regulator, thus making it possible to obtain continuous variation in the volume flow rate of the gas that is injected into the duct 15, and thus of the at least one hydraulic resonant frequency.

Both the variable gas volume hydraulic accumulator 8 in the first embodiment and the variable flow rate gas injection device 20 of the second embodiment can be connected equally well to a control unit 30 for controlling them by means of a variable setpoint that is issued by the control unit to the accumulator 8 and/or to the gas injection device 20. If the way the mechanical resonant frequency varies is known in advance, as a result of simulations and/or tests that have already been performed, this setpoint may be preprogrammed merely as a function of time. Nevertheless, it is also possible, and indeed preferable under certain circumstances, to cause this setpoint to vary in response to signals that are received in real time or almost in real time. For example, as shown in FIG. 1 or 3, the vehicle 1 may include at least one accelerometer 31 and a propellant pressure sensor 32 in the circuit 4. The accelerometer 31 is connected to the control unit 30 in order to send signals thereto representative of the mechanical behavior of the structure of the vehicle 1, and the pressure sensor 32 is also connected thereto in order to send signals representative of the hydraulic behavior of the circuit 4.

These signals are processed in the control unit 30 in order to extract the mechanical and hydraulic resonant frequencies by spectrum analysis. Filter algorithms, such as for example the "unscented" Kalman filter algorithm as described in "The unscented Kalman filter for nonlinear estimation", Proceedings of Symposium 2000 on Adaptive Systems for Signal Processing, Communication and Control (AS-SPCC), IEEE, Lake Louise, Alberta, Canada, October 2000, may be used, not only to filter noise from the signals, but even in predictive manner in order to forecast short-term variation in the resonant frequencies of the modes of oscillation, and to anticipate them in the way the hydraulic resonant frequency is controlled. The control unit may be programmed to initialize such a filter algorithm close to an expected mechanical resonant frequency, thereby making it possible subsequently to track this frequency in flight.

In a dynamic system such as a vehicle 1, it can be assumed that there exists a Markov sequence of latent states $x_t$ that vary in time in application of a function F. These latent states are observed indirectly by sensors giving measured states $y_t$ as obtained via a measurement function G. Thus, $x_t$ and $y_t$ can be expressed by the following formulas:

$$x_t = F(x_{t-}) + \epsilon$$

$$y_t = G(x_t) + \nu$$

The values $\epsilon$ and $\nu$ represent respectively the noise inherent to the system and measurement noise, and both of them present Gaussian distributions.

The object of a filter algorithm is to infer the state of the dynamic system from noisy values as measured by sensors. A Kalman system provides an inference that is fast and accurate for systems that are linear. It is nevertheless not directly applicable to systems that are non-linear, and the present application is potentially classifiable as a non-linear system. Among various alternatives for adapting the Kalman filter algorithm to non-linear systems, there is known in particular the "unscented" Kalman filter (UKF). This algorithm propagates several estimates of $x_t$ through the functions F and G and reconstructs a Gaussian distribution, assuming that the propagated values come from a linear system. The positions of these estimates for $x_t$ are referred to as "sigma points", and they are calculated from an initial average and variance with an approximation scheme referred to as an unscented transformation.

Figure 6A:
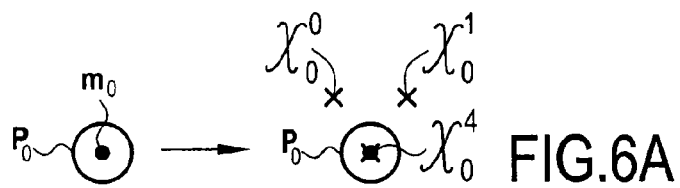
FIGS. 6A, 6B, 6C, and 6D are diagrams showing the operation of an "unscented" Kalman filter algorithm.
Figure 6B:
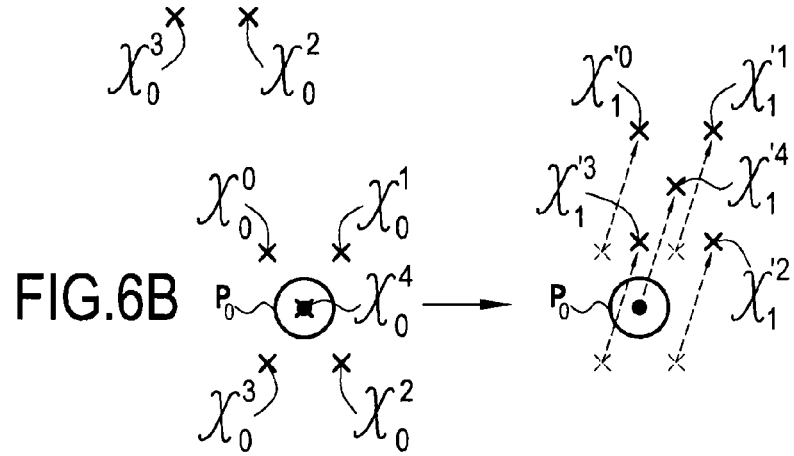
Figure 6C:
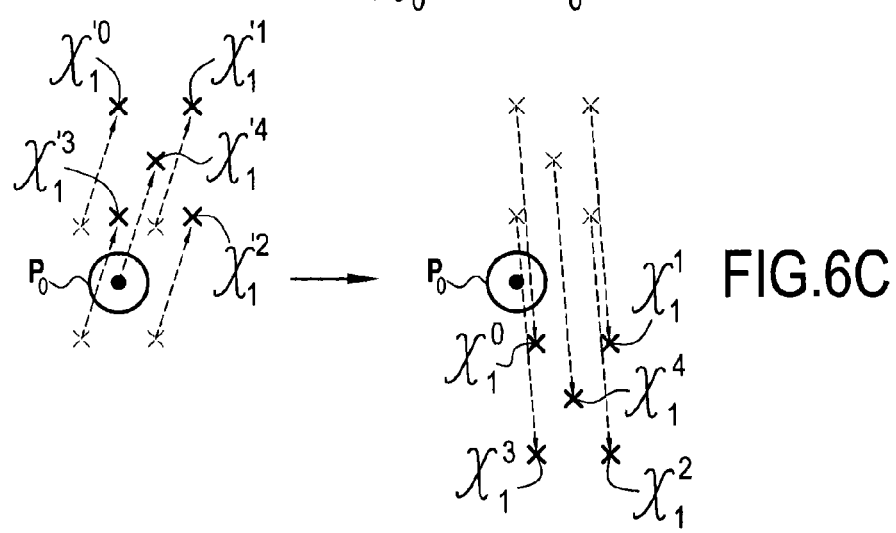
Figure 6D:
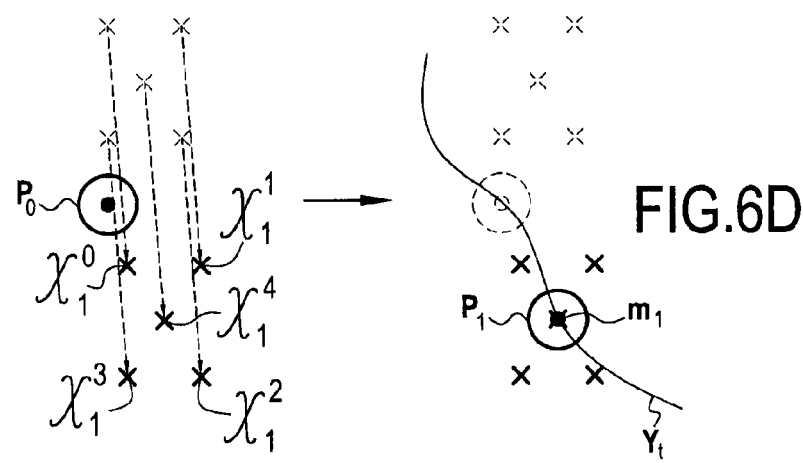

In FIG. 6A, a first step is shown in which the initial sigma points $X_0^0$, $X_0^1$, $X_0^2$, $X_0^3$, $X_0^4$ are calculated by such an unscented transformation starting from a mean $m_0$ and a variance $P_0$ taken into consideration for the latent state $x_0$ based on a first set of measurements $y_0$ at the initial moment $t=t_0$. Thereafter, in a prediction step, shown in FIG. 6B, estimated positions $X'_0^0$, $X'_0^1$, $X'_0^2$, $X'_0^3$, $X'_0^4$ for the sigma points corresponding to the following sampling instant ($t=t_1$) are predicted by applying the prediction step of the Kalman filter algorithm to the initial signal points $X_0^0$, $X_0^1$, $X_0^2$, $X_0^3$, $X_0^4$. In the following step of updating, as shown in FIG. 6C, the actual sigma points $X_0^1$, $X_1^1$, $X_1^2$, $X_1^3$, $X_1^4$ are calculated on the basis of the previous sampling at $t=t_1$. The differences between the positions $X'_0^0$, $X'_0^1$, $X'_0^2$, $X'_0^3$, $X'_0^4$ as predicted on the basis of the initial sigma points $X_0^0$, $X_0^1$, $X_0^2$, $X_0^3$, $X_0^4$ and the positions $X_1^0$, $X_1^1$, $X_1^2$, $X_1^3$, $X_1^4$ as actually calculated on the basis of the new sampling make it possible to obtain information about the function f representing variation of the latent state $x_t$ over time. In the following step, shown in FIG. 6D, the new mean $m_1$ and the new variance $P_1$ are calculated on the basis of the new sigma points $X_0^1$, $X_1^1$, $X_1^2$, $X_1^3$, $X_1^4$. This algorithm is recursive, and each step starting with the prediction step is repeated for each new sampling.

In the control unit, the mechanical and hydraulic resonant frequencies are compared, and by way of example if their difference approaches or crosses a certain threshold, the control unit 30 varies the setpoint that is transmitted to the accumulator 8 and/or to the gas injection device 20.

Figure 7A:
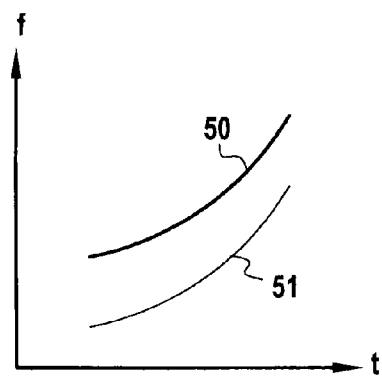
FIGS. 7A, 7B, 7C, and 7D are graphs showing three possible ways in which the hydraulic resonant frequency of the feed circuit can vary in response to a variation in a mechanical resonant frequency of the FIG. 1 vehicle.
Figure 7B:
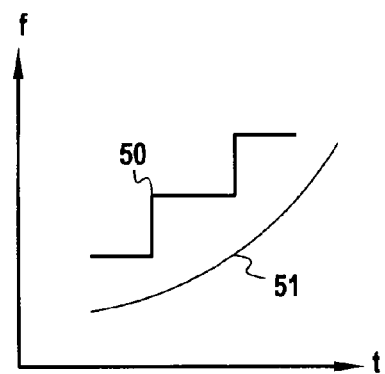
Figure 7C:
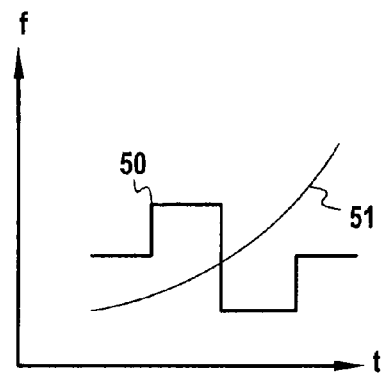
Figure 7D:
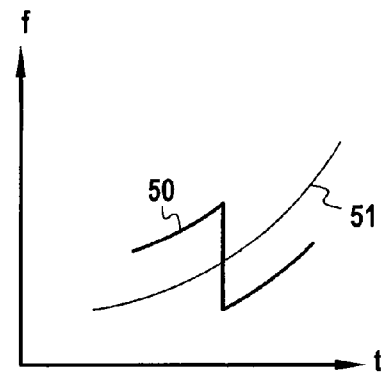

FIGS. 7A, 7B, 7C, and 7D show four examples of how a hydraulic resonant frequency 50 can be controlled in response to an increasing mechanical resonant frequency 51. In the first example, shown in FIG. 7A, the hydraulic resonant frequency 50 may be varied continuously so as to maintain a constant difference relative to the mechanical resonant frequency 51. In the second example, shown in FIG. 7B, the hydraulic resonant frequency 50 is varied stepwise so that the difference between the two frequencies 50 and 51 is not less than a given threshold. It may also happen that the hydraulic resonant frequency 50 cannot be varied over a range of frequencies that is great as the range over which the mechanical resonant frequency 51 can be varied. Under such circumstances, it is also possible, as shown in FIG. 7C, to implement an almost instantaneous change from a hydraulic resonant frequency 50 that is well above the mechanical resonant frequency 51 to a hydraulic resonant frequency 50 that is well below the mechanical resonant frequency 51 (or vice versa). Coincidence between the resonant frequencies takes place only momentarily and does not lead to dangerous resonance. Finally, it is also possible to combine gradual variations in the hydraulic resonant frequency 50 with abrupt changes, as shown in FIG. 7D.

The support structure of the rocket engine may also present a plurality of variable mechanical resonant frequencies, just as each feed circuit may present a plurality of hydraulic resonant frequencies. Under such circumstances, controlling the volume of gas in the feed circuit solely for the purpose of maintaining the difference between the hydraulic resonant frequency and the mechanical resonant frequency to a value greater than a predetermined threshold might not be adequate. In at least one alternative, the volume of gas may be controlled so as to maximize a function of differences between a plurality of pairs respectively of a hydraulic resonant frequency of the feed circuit and of a mechanical resonant frequency of the structure.

Thus, in a first example in which the feed circuit has two variable hydraulic resonant frequencies, namely a higher hydraulic resonant frequency $f_{h,high}$ and a lower hydraulic resonant frequency $f_{h,low}$, and the structure presents a variable mechanical resonant frequency $f_s$, the function that is to be maximized $R_{opt}$ may satisfy the following equation:

$$R_{opt} = \min\left(\left|\frac{f_{h,high} - f_s}{f_s}\right|, \left|\frac{f_{h,low} - f_s}{f_s}\right|\right)$$

This function may be a function that is weighted with one or more weighting coefficients. Thus, in a second example in which the feed circuit presents two variable hydraulic resonant frequencies, namely a high hydraulic resonant frequency $f_{h,high}$ and a low hydraulic resonant frequency $f_{h,low}$, and the structure presents two mechanical resonant modes, with a first mode mechanical resonant frequency $f_{s,1}$ and a second mode mechanical resonant frequency $f_{s,2}$, the function $R_{opt}$ for maximizing may satisfy the following equations:

$$R_{opt,1} = \min\left(\left|\frac{f_{h,high} - f_{s,1}}{f_{s,1}}\right|, \left|\frac{f_{h,low} - f_{s,1}}{f_{s,1}}\right|\right)$$

$$R_{opt,2} = \min\left(\left|\frac{f_{h,high} - f_{s,2}}{f_{s,2}}\right|, \left|\frac{f_{h,low} - f_{s,2}}{f_{s,2}}\right|\right)$$

$$R_{opt} = \min(R_{opt,1}, x_{1,2} R_{opt,2})$$

in which $x_{1,2}$ represents a weighting coefficient for the second mechanical resonance mode of the structure.

Although the present invention is described above with reference to specific embodiments, it is clear that other modifications and changes may be made to those embodiments without going beyond the general scope of the invention as defined by the claims. In particular, individual characteristics of the various embodiments shown may be combined in additional embodiments. Consequently, the description and the drawings should be considered in an illustrative sense rather than in a restrictive sense.

The invention claimed is:

1. A feed system for feeding a rocket engine with a liquid propellant, the system comprising:
   a feed circuit; and
   a device to vary a volume of gas in the feed circuit, which device is configured to cause a volume of gas in the feed circuit to vary while the rocket engine is in operation,
   wherein the device to vary the volume of gas comprises a hydraulic accumulator with a variable liquid level, the hydraulic accumulator including a plurality of dip tubes, each including a respective valve and connecting a duct of the feed circuit to a respective distinct liquid level, wherein each dip tube extends to a surface of the liquid at their respective distinct liquid level.

2. A feed system according to claim 1, further comprising a control unit configured to control the device to vary gas volume.

3. A feed system according to claim 2, further comprising at least one sensor connected to the control unit, and wherein the control unit is configured to control variation in the gas volume as a function of signals sensed by the at least one sensor.

4. A feed system according to claim 3, wherein the at least one sensor comprises an accelerometer.

5. A feed system according to claim 3, wherein the at least one sensor comprises a sensor to sense pressure of the propellant.

6. A feed system according to claim 2, wherein the control unit is configured to control variation of the gas volume as a function of time.

7. A vehicle comprising a rocket engine including a liquid propellant having a feed system according to claim 1.

8. A method of suppressing a POGO effect, comprising:
   varying a volume of gas in a feed circuit of a system to feed a rocket engine with a liquid propellant while the rocket engine is in operation, to control a difference between at least one hydraulic resonant frequency of the feed circuit and at least one mechanical resonant frequency of a structure coupled to the feed circuit,
   wherein the variable gas volume is located at least in part in a hydraulic accumulator connected to a duct of the feed circuit and including a plurality of dip tubes, each including a respective valve and connecting the duct to a respective distinct liquid level, wherein each dip tube extends to a surface of the liquid at their respective distinct liquid level.

9. A method of suppressing the POGO effect according to claim 8, wherein the gas volume varies to keep the difference above a predetermined threshold.

10. A method of suppressing the POGO effect according to claim 8, wherein the gas volume is caused to vary as a function of at least one mechanical oscillation value sensed on the structure.

11. A method of suppressing the POGO effect according to claim 10, further comprising performing spectral analysis on at least one mechanical oscillation to determine the at least one mechanical resonant frequency of the structure.

12. A method of suppressing the POGO effect according to claim 11, wherein a filter algorithm, or an unscented Kalman filter, is applied to at least one sensed mechanical oscillation to determine the at least one mechanical resonant frequency and/or to predict its future variation.

13. A non-transitory computer readable medium including computer executable instructions for performing a method of suppressing the POGO effect according to claim 8.

* * * * *